(12) United States Patent
Ueda et al.

(10) Patent No.: US 11,272,076 B2
(45) Date of Patent: Mar. 8, 2022

(54) IMAGE PROCESSING APPARATUS CONFIGURING COLOR CONVERSION INFORMATION BASED ON HOW CLOSE INPUT COLOR VALUES ARE TO BLACK IN DARK AND LIGHT RANGES

(71) Applicant: BROTHER KOGYO KABUSHIKI KAISHA, Nagoya (JP)

(72) Inventors: Masashi Ueda, Nagoya (JP); Yasunari Yoshida, Aichi-ken (JP); Tomoya Kondo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/167,157

(22) Filed: Feb. 4, 2021

(65) Prior Publication Data

US 2021/0248434 A1 Aug. 12, 2021

(30) Foreign Application Priority Data

Feb. 7, 2020 (JP) .............................. JP2020-019396

(51) Int. Cl.
*H04N 1/60* (2006.01)
*G06K 15/02* (2006.01)

(52) U.S. Cl.
CPC .......... *H04N 1/60* (2013.01); *G06K 15/1878* (2013.01); *H04N 1/6019* (2013.01);
(Continued)

(58) Field of Classification Search
CPC ...... H04N 1/60; H04N 1/6016; H04N 1/6019; H04N 1/6058; H04N 1/6061;
(Continued)

(56) References Cited

U.S. PATENT DOCUMENTS 6,867,883 B1 * 3/2005 Cholewo .............. H04N 1/6058
358/1.9
7,589,874 B2 * 9/2009 Sasaki .................. H04N 1/6058
345/589

(Continued)

FOREIGN PATENT DOCUMENTS

JP 2005-169751 A 6/2005
JP 2005-335191 A 12/2005
(Continued)

*Primary Examiner* — Scott A Rogers
(74) *Attorney, Agent, or Firm* — Scully, Scott, Murphy & Presser, PC

(57) ABSTRACT

Color conversion information is used for carrying out a color conversion process to generate a converted image data. The color conversion information is configured as follows. Within a range from a predetermined first reference color value to a black input color value on a specific line, the closer to the black input color value a noticed input color value is, the larger a first output component value becomes. Within a first dark range, the closer to the black input color value the noticed input color value is, the smaller a second output component value becomes. Within a first light range, the closer to the black input color value the noticed input color value is, the larger the second output component value becomes. Within a first intermediate range, the second output component value is constant.

16 Claims, 5 Drawing Sheets

(52) U.S. Cl.
CPC ....... *H04N 1/6061* (2013.01); *G06K 15/1836* (2013.01); *G06K 15/1881* (2013.01)

(58) Field of Classification Search
CPC ............... H04N 1/6063; H04N 1/6066; G06K 15/1878; G06K 15/188
See application file for complete search history.

(56) References Cited

U.S. PATENT DOCUMENTS

| | | |
|---|---|---|
| 8,780,424 B2 | 7/2014 | Yamada |
| 2009/0086228 A1 | 4/2009 | Koshida |
| 2012/0092734 A1 | 4/2012 | Yamada |

FOREIGN PATENT DOCUMENTS

| | | | |
|---|---|---|---|
| JP | 2009-159363 A | 7/2009 |
| JP | 2013-201666 A | 10/2013 |
| JP | 5510261 B2 | 6/2014 |

\* cited by examiner

IMAGE PROCESSING APPARATUS CONFIGURING COLOR CONVERSION INFORMATION BASED ON HOW CLOSE INPUT COLOR VALUES ARE TO BLACK IN DARK AND LIGHT RANGES

CROSS REFERENCE TO RELATED APPLICATION

The present application claims priority from Japanese Patent Application No. 2020-019396, filed on Feb. 7, 2020, the disclosure of which is incorporated herein by reference in its entirety.

BACKGROUND

Field of the Invention

The present specification relates to image processing for printing.

Description of the Related Art

Conventionally, in image processing for printing, color conversion processes are carried out to convert the color space of image data. For example, the color value of an RGB color space is converted to the color value of a CMYK color space. In a color conversion process of this kind, information such as a color conversion table and the like is used to determine a corresponding relation between the color values included in two respective color spaces (to be also referred to as color conversion information). Here in such a case, in order to suppress such problems as blurs, curls and the like of an image when a recording medium with little ink acceptance is used such as plain paper, recycled paper or the like, such a technique is proposed as to configure the color conversion information in the following manner. That is, the color conversion information is configured to record with one predetermined type of secondary color ink (red ink for example) and a primary color ink (cyan ink for example) in a complementary color relation with the former, for an area to form a gray scale image.

SUMMARY

With respect to the aspect of expanding the color gamut of a color to print, sufficient refinement has not yet been made in actual practices.

The present specification discloses a technique for expanding the color gamut of a color to be printed.

According to an aspect of the present disclosure, there is provided an image processing apparatus including: a controller and a supplier. The controller is configured to: obtain a target image data expressed by color values of a first color space; convert the target image data into a converted image data expressed by color values of a second color space, by a color conversion process using color conversion information expressing a corresponding relation between an input color value which is a color value of the first color space and an output color value which is a color value of the second color space; and generate a print data using the converted image data. The supplier is configured to supply the print data to a printer unit configured to print an image by using L types of color materials ($L \geq 2$) including a first color material and a second color material different in color from the first color material. The input color value of the first color space is expressed by each value of N input color components ($N \geq 2$), and the output color value of the second color space is expressed by each value of L output color components corresponding to the L types of color materials. On an outer envelope of a color gamut of the first color space, white input color value is defined as the color value expressing the lightest white, black input color value is defined as the color value expressing the darkest black, and a specific line is defined as a line including a white-side partial line connecting the white input color value and a specific input color value on the outer envelope at the shortest distance, and a black-side partial line connecting the specific input color value and the black input color value at the shortest distance. A noticed output color value is the output color value associated with a noticed input color value on the specific line by the color conversion information. A first output component value is a value of the output color component of the noticed output color value corresponding to the first color material. A second output component value is a value of the output color component of the noticed output color value corresponding to the second color material. The color conversion information is configured such that: within the range from a predetermined first reference color value to the black input color value on the specific line, the closer to the black input color value the noticed input color value is, the larger the first output component value becomes; within a first dark range on the specific line which includes the black input color value and which is closer to the black input color value than the predetermined first reference color value, the closer to the black input color value the noticed input color value is, the smaller the second output component value becomes; within a first light range on the specific line which includes the white input color value, the closer to the black input color value the noticed input color value is, the larger the second output component value becomes; and within a first intermediate range on the specific line between the first light range and the first dark range, the second output component value is constant. The target image data includes the input color value with which the second output component value is constant within the first intermediate range when the first output component value increases, and the converted image data includes the output color value with which the second output component value is constant within the first intermediate range when the first output component value increases. The controller is configured to generate the print data by using the converted image data which includes the output color value with which the second output component value is constant within the first intermediate range when the first output component value increases.

According to the above configuration, in the part closer to the black input color value than the first reference color value in the first intermediate range on the specific line, the closer to the black input color value the noticed input color value is, the larger the first output component value becomes whereas the second output component value is constant. Therefore, compared to the case where the closer to the black input color value the noticed input color value is, the smaller the second output component value becomes, it is possible to expand the color gamut of dark colors to be printed.

Note that the technique disclosed in the present specification can be realized in various forms such as, for example, in the forms of being applied in an image processing method and an image processing apparatus, a printing method and a printing apparatus, a computer program for realizing the function of each of those methods and apparatuses, a computer readable medium (for example, a non-transitory computer readable medium) storing the computer program, or the like.

DESCRIPTION OF THE EMBODIMENT

Embodiment

Figure 1:
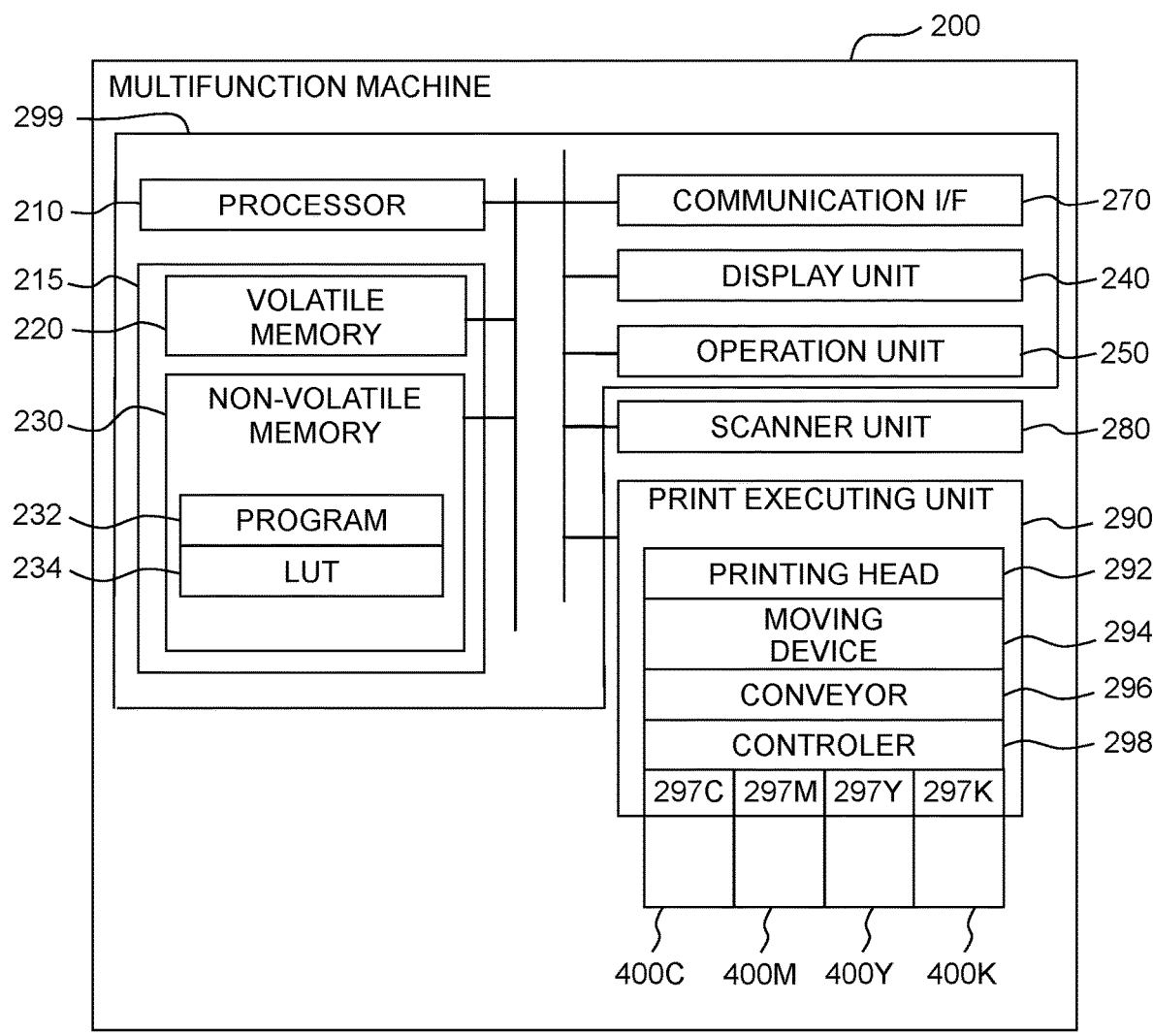
FIG. 1 is an explanatory diagram depicting a multifunctional peripheral 200 according to an embodiment of the present invention.

FIG. 1 is an explanatory diagram depicting a multifunctional peripheral 200 according to an embodiment of the present disclosure. A multifunctional peripheral 200 has a controller 299, a scanner 280, and a printer unit 290. The controller 299 has a processor 210, a memory 215, a display 240 to display images, an operating part 250 to accept a user's operations, and a communication interface 270. Those elements are connected to each other via a data bus. The memory 215 includes a volatile memory 220 and a non-volatile memory 230.

The processor 210 is a device such as a CPU, adapted to carry out data processing. The volatile memory 220 is a DRAM, for example, whereas the non-volatile memory 230 is a flash memory, for example.

The non-volatile memory 230 stores a program 232 and a color conversion look-up table 234. The processor 210 executes the program 232 to realize various functions. Descriptions will be made later on, respectively, for the details of the functions realized by the processor 210, and the color conversion look-up table 234. The processor 210 causes a memory (for example, the volatile memory 220 or the non-volatile memory 230) to temporarily store various intermediate data to be used in executing the program 232.

The display 240 is a device such as a liquid crystal display, adapted to display images. The operating part 250 is a device such as a touch panel arranged on the display 240 to superimpose the same, adapted to accept the user's operations. With operations on the operating part 250, the user can input various instructions to the multifunctional peripheral 200.

The communication interface 270 is an interface for communications with other devices (such as a USB interface, a wired LAN interface, an IEEE 802.11 wireless interface, or the like).

The scanner 280 generates scan data expressing read-in images (to be referred to as "scanned image") by optically reading the objects such as manuscripts or the like, using photoelectric conversion elements such as CCD, CMOS, or the like. The scan data is, for example, an RGB bitmap data expressing a scanned image in color.

The printer unit 290 is a printer device of an ink jet type for printing image on (printing) paper (an example of media) by using inks of cyan C, magenta M, yellow Y and black K, respectively. The printer unit 290 has a printing head 292 (to be simply referred to as head 292, too), a moving device 294, a conveyer 296, installing units 297C, 297M, 297Y, and 297K, and a controller 298 which is an electric circuit configured to control each element of the printer unit 290. The controller 298 may include a computer. The installing units 297C, 297M, 297Y, and 297K are installed therein with cartridges 400C, 400M, 400Y, and 400K, respectively, to accommodate the inks of the cyan C, the magenta M, the yellow Y and the black K.

The moving device 294 is a device provided to reciprocatingly move the head 292 parallel to a predetermined primary scanning direction. Illustration being omitted, the moving device 294 has, for example, rails supporting the head 292 in such a manner as able to slide in the primary scanning direction, a plurality of pulleys, a belt which is stretched on the plurality of pulleys and part of which is fixed on the head 292, and a motor causing the pulleys to rotate. The motor moves the head 292 in the primary scanning direction by causing the pulleys to rotate.

The conveyer 296 is a device provided to convey the paper in a predetermined secondary scanning direction with respect to the head 292. In this embodiment, the secondary scanning direction is perpendicular to the primary scanning direction. Illustration being omitted, the conveyer 296 has, for example, a platen supporting the paper in a position facing the head 292, rollers moving the paper in the secondary scanning direction, and a motor causing the rollers to rotate. With the motor causing the rollers to rotate, the paper is moved in the secondary scanning direction.

On the lower surface of the head 292, four nozzle groups (not depicted) are formed for jetting the inks of the cyan C, the magenta M, the yellow Y and the black K, respectively. The head 292 and the installing units 297C, 297M, 297Y, and 297K are connected by undepicted ink supply channels. Each nozzle is connected to an ink supply channel for the corresponding ink via an ink flow channel (not depicted) formed inside the head 292. In the head 292, each ink flow channel is provided with an actuator (illustration omitted; for example, a piezo element, a heater, and the like) for jetting the ink from the nozzles.

The controller 298 causes the head 292 to move in the primary scanning direction while jetting ink droplets toward the paper from a plurality of nozzles of the plurality of nozzle groups, so as to form ink dots on the paper. The controller 298 carries out a plurality of formations of the ink dots and conveyances of the paper, to print the entire image on the paper.

The multifunctional peripheral 200 has a function of causing the printer unit 290 to print an image by using the image data provided by the user. Further, the multifunctional peripheral 200 has a function of causing the printer unit 290 to print an image by using the print data supplied by another device (for example, an undepicted data processing device connected to the communication interface 270).

Figure 2:
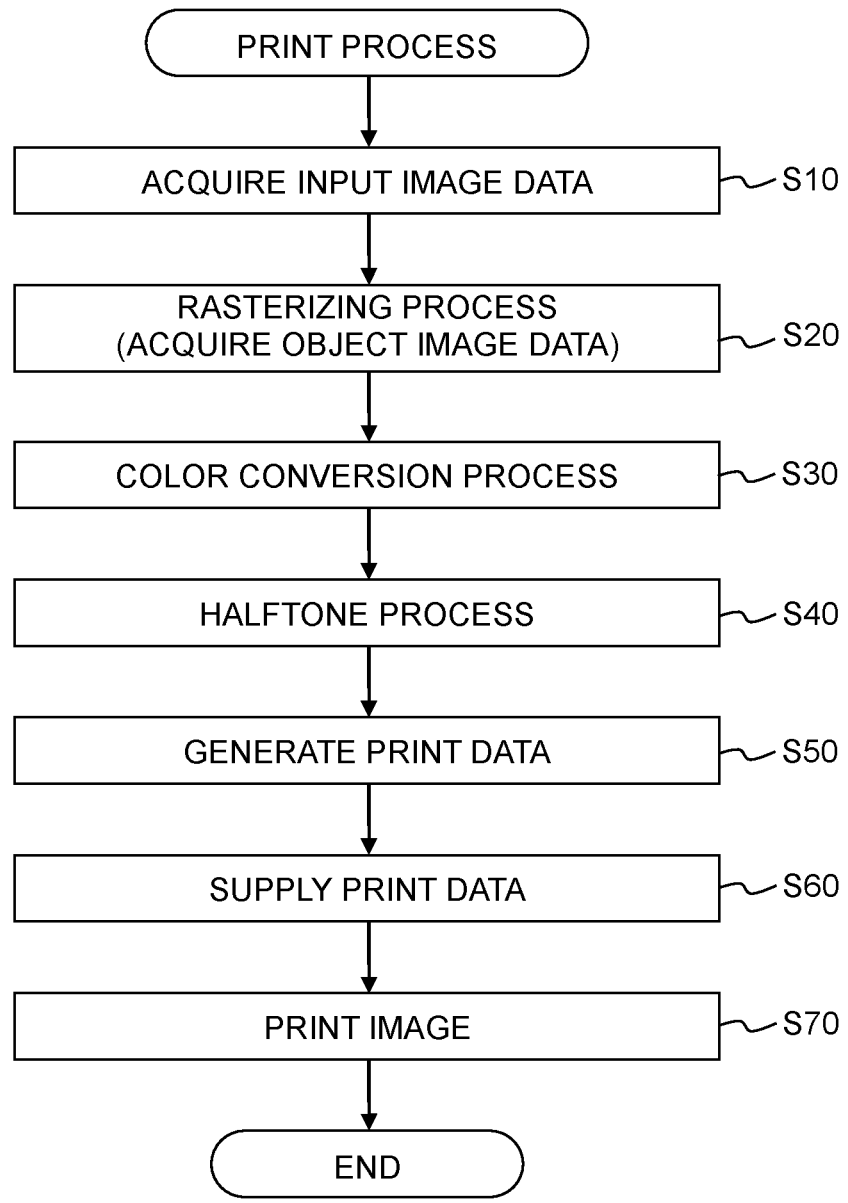
FIG. 2 is a flow chart depicting an example of printing process.

FIG. 2 is a flow chart depicting an example of printing process. Hereinbelow, suppose that the processor 210 (FIG. 1) carries out the process of FIG. 2 following the program 232. The controller 299 provided with the processor 210 is an example of image processing apparatus carrying out image processing for printing. Further, in this embodiment, suppose that the processor 210 starts the process of FIG. 2 in response to a start instruction from the user. Any usable method may be applied to inputting the start instruction. In this embodiment, the user inputs the start instruction by operating on the operating part 250 (FIG. 1). The start instruction includes information designating an input image data presenting an input image for printing. The input image data may be various types of data such as, for example, image data already stored in the memory 215 (for example, the non-volatile memory 230).

In the step S10, the processor 210 acquires the input image data designated in the start instruction. Various data formats may be applied to the input image data such as, for example, the data format described by a page description language, the JPEG format, or the like.

In the step S20, the processor 210 uses the input image data to acquire the target or object image data which is the image data of the object of an aftermentioned color conversion process. In this embodiment, the object image data is an RGB bitmap data expressing the color of each pixel by the value of each RGB color component. Further, suppose that the value of each RGB color component is expressed in 256 gradations from 0 to 255. When the data format of the input image data is different from the bitmap format (such as the data format described by the page description language), then the processor 210 generates the object image data by carrying out a rasterizing process on the input image data. When the data format of the input image data is the bitmap format (such as the JPEG format), then the processor 210 generates the object image data by converting the resolution of the input image data (that is, the pixel density) into a resolution for print processing. When the input image data has the same resolution as that for print processing, then the processor 210 may adopt the input image data per se as the object image data.

In the step S30, the processor 210 generates a converted image data by carrying out the color conversion process on the object image data. The converted image data is image data expressing the color of each pixel by the value of a color component corresponding to a color material usable for printing. In this embodiment, the converted image data is a CMYK image data expressing the color of each pixel by the value of each CMYK color component. The color conversion process is carried out by using the color conversion look-up table 234 expressing a corresponding relation between the color value of the RGB color space and the color value of the CMYK color space. Hereinbelow, the color space before the color conversion will be referred to as the first color space or the input color space. The color space after the color conversion will be referred to as the second color space or the output color space. In this embodiment, the first color space is an RGB color space, while the second color space is a CMYK color space. The color conversion look-up table 234 will be described in detail later on.

In the step S40, the processor 210 carries out a halftone process on the converted image data. The halftone process converts the CMYK values of the pixels of the converted image data into a dot data. The dot data expresses a dot formation state according to each pixel, for each color component of CMYK. In this embodiment, the value of each pixel of the dot data is expressed in two gradations as "without dot" and "with dot". Note that the value of each pixel of the dot data may be expressed in three gradations or more (such as in four gradations: "without dot", "small (dot)", "medium", and "large"). The halftone process is carried out by using a publicly known method such as the dither method, the error diffusion method, or the like.

The larger the value of the color component of the cyan C in the converted image data, the more the ink quantity (ink volume) per unit area specified by the dot data of the cyan C. Much the same is true on the other color components of MYK. In this manner, the value of each color component of CMYK indicates the ink quantity per unit area.

In the step S50, the processor 210 generates a print data by using the dot data. The print data is in a data format which can be interpreted by the controller 298 of the printer unit 290. The processor 210 generates the print data by carrying out, for example, a process of sorting the dot data according to the order to be used in printing, and a process of adding printer control codes and data identification codes to the dot data. In the step S60, the processor 210 supplies the print data to the printer unit 290. The processor 210 functions as a supplier 211 (See FIG. 2). In the step S70, the controller 298 of the printer unit 290 prints the image by controlling the printer unit 290 according to the print data. Then, the process of FIG. 2 is ended.

Figure 3:
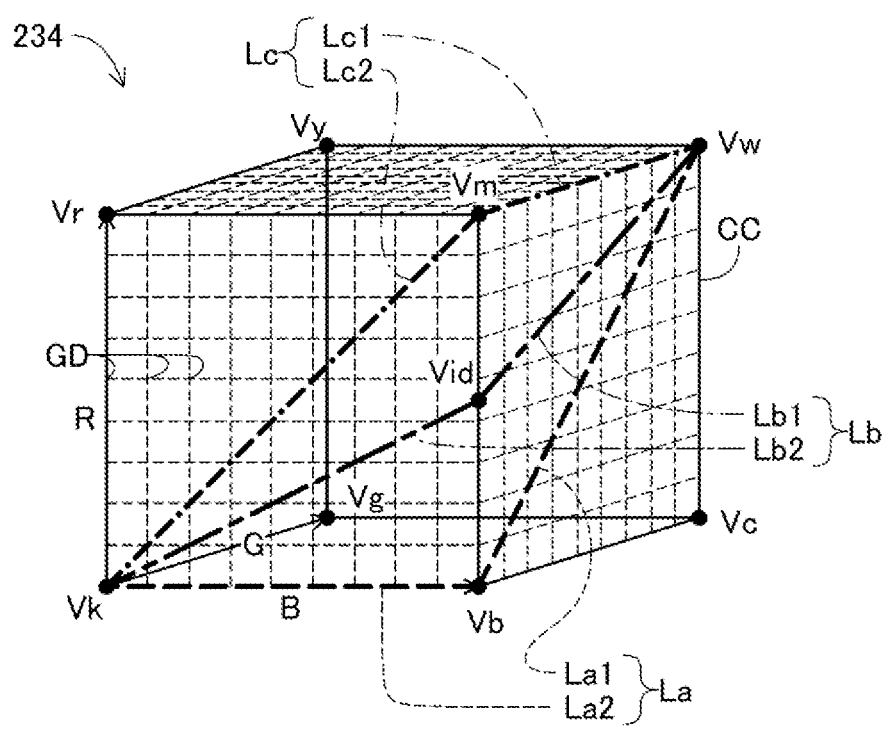
FIG. 3 is an explanatory view of a color conversion look-up table 234.

FIG. 3 is an explanatory view of a color conversion look-up table 234, depicting a color solid CC expressed by the RGB color components. The color solid CC shows the color gamut of the RGB color space (to be referred below as color gamut CC, too). As depicted in FIG. 3, the color solid CC is a cubic when the RGB color space is expressed by an orthogonal coordinate system of three dimensions. In FIG. 3, each of the eight vertexes of the color solid CC is assigned with numbers to express the color (in particular, the black vertex Vk (0, 0, 0), the red vertex Vr (255, 0, 0), the green vertex Vg (0, 255, 0), the blue vertex Vb (0, 0, 255), the cyan vertex Vc (0, 255, 255), the magenta vertex Vm (255, 0, 255), the yellow vertex Vy (255, 255, 0), and the white vertex Vw (255, 255, 255)). The numbers in parentheses indicate the values of the color components of (red R, green G, and blue B). Further, FIG. 3 also shows the indigo point Vid (128, 0, 255) indicating the color value of the indigo blue between the magenta vertex Vm and the blue vertex Vb.

In this embodiment, a plurality of grids GD are arranged in the color solid CC. The red R value of each grid GD is one of the values as many as Q+1 obtained by equally dividing the red R range (from zero to 255 here in the case) into Q parts (Q is 9, 17, 255 or the like, for example). Each value of the green G and the blue B of each grid GD is, in the same manner, also one of the values as many as Q+1. The color conversion look-up table 234 shows a corresponding relation between the color value of the RGB color space and the color value of the CMYK color space, in each of the plurality of grids GD. In the step S30 (FIG. 2), the processor 210 refers to the color conversion look-up table 234, and converts the RGB color values of the pixels of the object image data into the CMYK color values. When the RGB color values are equal to the color values of the grid GD, then the processor 210 adopts the CMYK color values associated to that grid GD. When the RGB color values are different from the color values of the grid GD, then the processor 210 calculates the CMYK color values with an interpolation (a delta cone interpolation, for example) using a plurality of grids GD in the vicinity of the RGB color values. Hereinbelow, the RGB color values will be also referred to as input color values RGB, and the CMYK color values also as output color values CMYK.

FIG. 3 shows three lines La to Lc on the outer envelope of the color gamut CC. The outer envelope of the color gamut CC is surfaces where at least one value of the plurality of color components constituting the color space is the minimum value or the maximum value within the possible range of that color components. In the example of FIG. 3, the surfaces where at least one value of RBG is the minimum value (zero) or the maximum value (255) correspond to the outer envelope; in particular, the six outer surfaces of the color solid CC correspond to the outer envelope. All of the three lines La to Lc connect the white vertex Vw and the black vertex Vk on the outer envelope.

The first line La passes through the blue vertex Vb. The first line La is comprised of a first white side partial line La1 connecting the white vertex Vw and the blue vertex Vb, and a first black side partial line La2 connecting the blue vertex Vb and the black vertex Vk. The partial lines La1 and La2 are both straight lines in the orthogonal coordinate system, connecting the color values of their two ends at the shortest distance. Here in this case, suppose that the Euclid distance in the orthogonal coordinate system is applied to the distance between two color values.

The second line Lb passes through the indigo point Vid. The second line Lb is comprised of a second white side partial line Lb1 connecting the white vertex Vw and the indigo point Vid, and a second black side partial line Lb2 connecting the indigo point Vid and the black vertex Vk. The partial lines Lb1 and Lb2 are both straight lines connecting the color values of their two ends at the shortest distance.

The third line Lc passes through the magenta vertex Vm. The third line Lc is comprised of a third white side partial line Lc1 connecting the white vertex Vw and the magenta vertex Vm, and a third black side partial line Lc2 connecting the magenta vertex Vm and the black vertex Vk. The partial lines Lc1 and Lc2 are both straight lines connecting the color values of their two ends at the shortest distance.

Figure 4A:
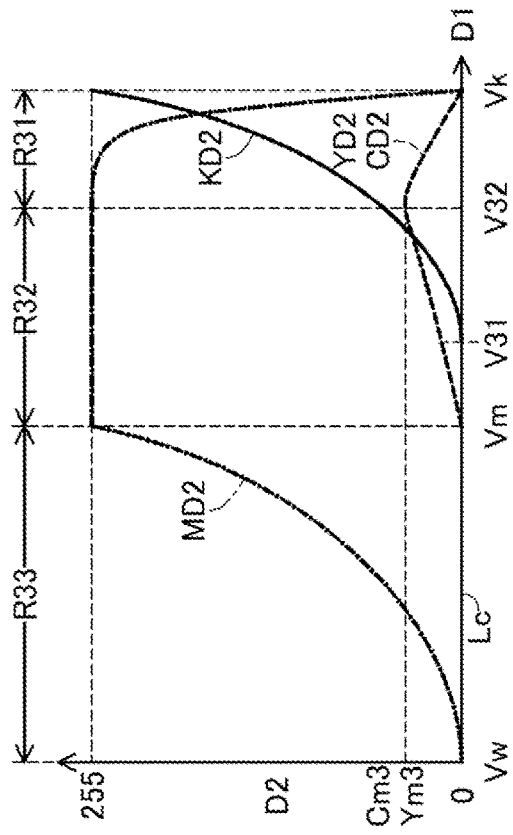
FIGS. 4A, 4B and 4C are graphs depicting examples of corresponding relation on lines La to Lc.
Figure 4B:
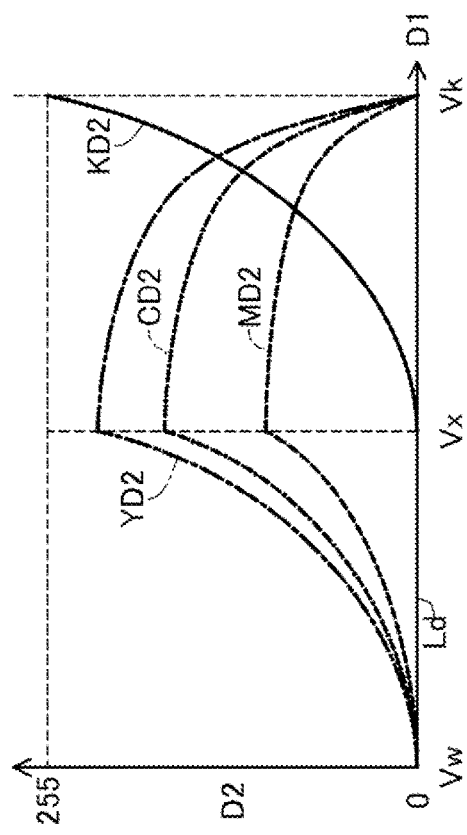
Figure 4C:
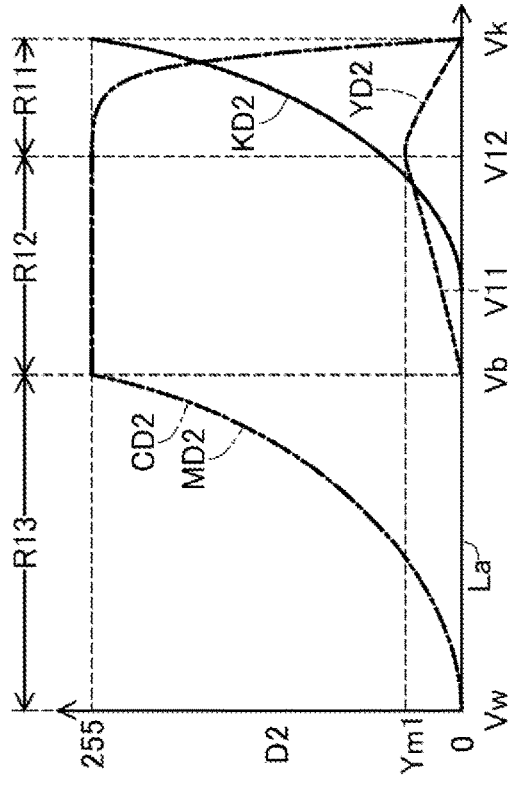

In this embodiment, the color conversion look-up table 234 sets up a corresponding relation between the input color value RGB and the output color value CMYK on those lines La to Lc in order to expand the color gamut of dark colors to be printed. FIGS. 4A to 4C are graphs depicting examples of corresponding relation on the lines La to Lc. The horizontal axis shows a position D1 of the input color value RGB on the lines La to Lc. The vertical line shows each component value D2 of CMYK. Graphs CD2, MD2, YD2, and KD2 show component values D2 of C, M, Y, and K, respectively. Hereinbelow, the component values D2 of C, M, Y, and K will also be referred to as component values CD2, MD2, YD2, and KD2, using the same alpha-numerals as in the graphs.

FIG. 4A shows an example of corresponding relation on the first line La passing through the blue vertex Vb, and shows a predetermined first reference color value V11 arranged between the black vertex Vk and the white vertex Vw on the first line La. In the range from the first reference color value V11 to the black vertex Vk, the closer to the black vertex Vk the input color value RGB is, the larger the component value KD2 of the black K becomes. In the example of FIG. 4A, when the input color value RGB moves from the first reference color value V11 to the black vertex Vk, then the component value KD2 of the black K increases from zero up to 255 (that is, the maximum value).

FIG. 4A shows three ranges R11 to R13. The right range R11 includes the black vertex Vk (to be also referred to as blue dark range R11). The blue dark range R11 extends from a predetermined second reference color value V12 to the black vertex Vk. The second reference color value V12 is closer to the black vertex Vk than the first reference color value V11. The left range R13 includes the white vertex Vw (to be also referred to as blue light range R13). In this embodiment, the blue light range R13 extends from the white vertex Vw to the blue vertex Vb. The central range R12 lies between the blue light range R13 and the blue dark range R11 (to be also referred to as blue intermediate range R12). In this embodiment, the first reference color value V11 is positioned in the blue intermediate range R12.

In the blue light range R13, the closer to the black vertex Vk the input color value RGB is, the larger the component values CD2 and MD2 of the cyan C and the magenta M become. When the input color value RGB moves from the white vertex Vw to the blue vertex Vb, then the component values CD2 and MD2 of the cyan C and the magenta M increase from zero up to 255. The component value YD2 of the yellow Y and the component value KD2 of the black K are zero. In the above manner, when the input color value RGB moves from the white vertex Vw to the blue vertex Vb, then the color expressed by the output color value CMYK changes from the white to a blue having a high saturation.

In the blue intermediate range R12, the component values CD2 and MD2 of the cyan C and the magenta M are constant (in particular, CD2=MD2=255). The closer to the black vertex Vk the input color value RGB is, the larger the component value YD2 of the yellow Y becomes. When the input color value RGB moves from the blue vertex Vb to the second reference color value V12, then the component value YD2 of the yellow Y increases from zero up to the maximum value Ym1 (zero<Ym1<255). The component value KD2 of the black K is zero within the range from the blue vertex Vb to the first reference color value V11. When the input color value RGB moves from the first reference color value V11 to the second reference color value V12, then the component value KD2 of the black K increases from zero. In the above manner, when the input color value RGB moves from the blue vertex Vb to the second reference color value V12, then the color expressed by the output color value CMYK changes from the blue having the high saturation to a dark blue. Note that between the blue light range R13 and the blue intermediate range R12, the component values CD2, MD2, YD2, and KD2 are continuous.

In the blue dark range R11, the closer to the black vertex Vk the input color value RGB is, the smaller the component values CD2, MD2 and YD2 of the cyan C, the magenta M and the yellow Y become. When the input color value RGB moves from the second reference color value V12 to the black vertex Vk, then the component values CD2 and MD2 of the cyan C and the magenta M decrease from 255 down to zero, and the component value YD2 of the yellow Y decreases from the maximum value Ym1 down to zero. When the input color value RGB moves from the second reference color value V12 to the black vertex Vk, then the component value KD2 of the black K increases up to 255. In the above manner, when the input color value RGB moves from the second reference color value V12 to the black vertex Vk, then the color expressed by the output color value CMYK changes from the dark blue to the black. Note that between the blue intermediate range R12 and the blue dark range R11, the component values CD2, MD2, YD2, and KD2 are continuous.

Note that on the first line La, the component value CD2 of the cyan C may be equal to the component value MD2 of the magenta M, regardless of the input color value RGB, thereby suppressing the change of the color phase expressed by the output color value CMYK. However, on at least part of the first line La, the component value CD2 may differ from the component value MD2.

FIG. 4B shows an example of corresponding relation on the second line Lb passing through the indigo point Vid, and shows another predetermined first reference color value V21 arranged between the black vertex Vk and the white vertex Vw on the second line Lb. In the range from the first reference color value V21 to the black vertex Vk, the closer to the black vertex Vk the input color value RGB is, the larger the component value KD2 of the black K becomes. In the example of FIG. 4B, when the input color value RGB moves from the first reference color value V21 to the black vertex Vk, then the component value KD2 of the black K increases from zero up to 255 (that is, the maximum value).

FIG. 4B shows three ranges R21 to R23. The right range R21 includes the black vertex Vk (to be also referred to as indigo dark range R21). The indigo dark range R21 extends from a predetermined second reference color value V22 to the black vertex Vk. The second reference color value V22 is closer to the black vertex Vk than the first reference color value V21. The left range R23 includes the white vertex Vw (to be also referred to as indigo light range R23). In this embodiment, the indigo light range R23 extends from the white vertex Vw to the indigo point Vid. The central range R22 lies between the indigo light range R23 and the indigo dark range R21 (to be also referred to as indigo intermediate range R22). In this embodiment, the first reference color value V21 is positioned in the indigo intermediate range R22.

In indigo light range R23, the closer to the black vertex Vk the input color value RGB is, the larger the component values CD2 and MD2 of the cyan C and the magenta M become. When the input color value RGB moves from the white vertex Vw to the indigo point Vid, then the component value CD2 of the cyan C increases from zero up to 128 while the component value MD2 of the magenta M increases from zero up to 255. The component values YD2 and KD2 of the yellow Y and the black K are zero. In the above manner, when the input color value RGB moves from the white vertex Vw to the indigo point Vid, then the color expressed by the output color value CMYK changes from the white to an indigo blue having a high saturation.

In the indigo intermediate range R22, the component value MD2 of the magenta M is constant (in particular, MD2=255). The closer to the black vertex Vk the input color value RGB is, the larger the component values CD2 and YD2 of the cyan C and the yellow Y become. When the input color value RGB moves from the indigo point Vid to the second reference color value V22, then the component value CD2 of the cyan C increases from 128 up to the maximum value Cm2 (zero<Cm2<255). The component value YD2 of the yellow Y increases from zero up to the maximum value Ym2 (zero<Ym2<255). The component value KD2 of the black K is zero in the range from the indigo point Vid to the first reference color value V21. When the input color value RGB moves from the first reference color value V21 to the second reference color value V22, then the component value KD2 of the black K increases from zero. In the above manner, when the input color value RGB moves from the indigo point Vid to the second reference color value V22, then the color expressed by the output color value CMYK changes from the indigo blue having the high saturation to a dark indigo blue. Note that between the indigo light range R23 and the indigo intermediate range R22, the component values CD2, MD2, YD2, and KD2 are continuous.

In the indigo dark range R21, the closer to the black vertex Vk the input color value RGB is, the smaller the component values CD2, MD2 and YD2 of the cyan C, the magenta M and the yellow Y become. When the input color value RGB moves from the second reference color value V22 to the black vertex Vk, then the component value CD2 of the cyan C decreases from the maximum value Cm2 down to zero, the component value MD2 of the magenta M decreases from 255 down to zero, and the component value YD2 of the yellow Y decreases from the maximum value Ym2 down to zero. When the input color value RGB moves from the second reference color value V22 to the black vertex Vk, then the component value KD2 of the black K increases up to 255. In the above manner, when the input color value RGB moves from the second reference color value V22 to the black vertex Vk, then the color expressed by the output color value CMYK changes from the dark indigo blue to the black. Note that between the indigo intermediate range R22 and the indigo dark range R21, the component values CD2, MD2, YD2, and KD2 are continuous.

On the second line Lb, the component values CD2, MD2 and YD2 of CMY differ from each other (in the example of FIG. 4B, YD2<CD2<MD2. However, the white vertex Vw and the black vertex Vk are excluded). Therefore, when one component value changes, then the color phase expressed by the output color value CMYK may vary due to that change. In this embodiment, the corresponding relation on the second line Lb is configured to suppress the change of the color phase expressed by the output color value CMYK when the input color value RGB changes on the second line Lb. In particular, the corresponding relation on the second line Lb is specified by using a ratio RD of differences DF1 and DF2 (=DF2/DF1; the ratio RD will be also referred to below as difference ratio RD). The differences DF1 and DF2 are calculated in the following manner from the component values CD2, MD2 and YD2 of CMY corresponding to a noticed color value V23 which is the input color value RGB being noticed. The first difference DF1 is obtained by subtracting the minimum value from the maximum value, among the component values CD2, MD2 and YD2. In the example of FIG. 4B, DF1=MD2−YD2. The second difference DF2 is obtained by subtracting the minimum value from the medium value, among the component values CD2, MD2 and YD2. In the example of FIG. 4B, DF2=CD2−YD2. The difference ratio RD (=DF2/DF1) obtained from those differences DF1 and DF2 is a preferable index value indicating the color phase of the color expressed by the output color value CMYK. In this embodiment, on the second line Lb, the corresponding relation is configured for the difference ratio RD to be constant regardless of the input color value RGB.

FIG. 4C shows an example of corresponding relation on the third line Lb passing through the magenta vertex Vm, and shows still another predetermined first reference value V31 arranged between the black vertex Vk and the white vertex Vw on the third line Lc. In the range from the first reference value V31 to the black vertex Vk, the closer to the black vertex Vk the input color value RGB is, the larger the component value KD2 of the black K becomes. In the example of FIG. 4C, when the input color value RGB moves from the first reference value V31 to the black vertex Vk, then the component value KD2 of the black K increases from zero up to 255 (that is, the maximum value).

FIG. 4C shows three ranges R31 to R33. The right range R31 includes the black vertex Vk (to be also referred to as magenta dark range R31). The magenta dark range R31 extends from a predetermined second reference value V32 to the black vertex Vk. The second reference value V32 is closer to the black vertex Vk than the first reference value V31. The left range R33 includes the white vertex Vw (to be also referred to as magenta light range R33). In this embodiment, the magenta light range R33 extends from the white vertex Vw to the magenta vertex Vm. The central range R32 lies between the magenta light range R33 and the magenta dark range R31 (to be also referred to as magenta intermediate range R32). In this embodiment, the first reference value V31 is positioned in the magenta intermediate range R32.

In the magenta light range R33, the closer to the black vertex Vk the input color value RGB is, the larger the component value MD2 of the magenta M becomes. When the input color value RGB moves from the white vertex Vw to the magenta vertex Vm, then the component value MD2 of the magenta M increases from zero up to 255 while the component values CD2, YD2 and KD2 of the cyan C, the yellow Y and the black K are zero. In the above manner, when the input color value RGB moves from the white vertex Vw to the magenta vertex Vm, then the color expressed by the output color value CMYK changes from the white to a magenta having a high saturation.

In the magenta intermediate range R32, the component value MD2 of the magenta M is constant (in particular, MD2=255). The closer to the black vertex Vk the input color value RGB is, the larger the component values CD2 and YD2 of the cyan C and the yellow Y become. When the input color value RGB moves from the magenta vertex Vm to the second reference value V32, then the component value CD2 of the cyan C increases from zero up to the maximum value Cm3 (zero<Cm3<255). The component value YD2 of the yellow Y increases from zero up to the maximum value Ym3 (zero<Ym3<255). The component value KD2 of the black K is zero within the range from the magenta vertex Vm to the first reference value V31. When the input color value RGB moves from the first reference value V31 to the second reference value V32, then the component value KD2 of the black K increases from zero. In the above manner, when the input color value RGB moves from the magenta vertex Vm to the second reference value V32, then the color expressed by the output color value CMYK changes from the magenta having the high saturation to a dark magenta. Note that between the magenta light range R33 and the magenta intermediate range R32, the component values CD2, MD2, YD2, and KD2 are continuous.

In the magenta dark range R31, the closer to the black vertex Vk the input color value RGB is, the smaller the component values CD2, MD2 and YD2 of the cyan C, the magenta M and the yellow Y become. When the input color value RGB moves from the second reference value V32 to the black vertex Vk, then the component value CD2 of the cyan C decreases from the maximum value Cm3 down to zero, the component value MD2 of the magenta M decreases from 255 down to zero, and the component value YD2 of the yellow Y decreases from the maximum value Ym3 down to zero. When the input color value RGB moves from the second reference value V32 to the black vertex Vk, then the component value KD2 of the black K increases up to 255. In the above manner, when the input color value RGB moves from the second reference value V32 to the black vertex Vk, then the color expressed by the output color value CMYK changes from the dark magenta to the black. Note that between the magenta intermediate range R32 and the magenta dark range R31, the component values CD2, MD2, YD2, and KD2 are continuous.

Note that on the third line Lc, the component value CD2 of the cyan C may be equal to the component value YD2 of the yellow Y, regardless of the input color value RGB, thereby suppressing the change of the color phase expressed by the output color value CMYK. However, on at least part of the third line Lc, the component value CD2 may differ from the component value YD2.

In the above manner, the corresponding relation on the lines La to Lc has the following configuration. That is, in the intermediate ranges R12 to R13, for the range closer to the black vertex Vk than the first reference color values V11, V21, and V31, when the input color value RGB moves toward the black vertex Vk, then the component value KD2 of the black K becomes larger whereas the component value of a specific color component (the magenta M for example) is constant. Therefore, compared with the case where the closer to the black vertex Vk the input color value RGB is, the smaller the component value of a specific color component becomes, it is possible to expand the color gamut of a dark color to be printed. For example, when a photo of an object having a dark color is printed, it is possible to improve the brightness of the object. Further, in the dark ranges R11, R21 and R31 including the black vertex Vk, when the input color value RGB moves toward the black vertex Vk, then the component value KD2 of the black K increases whereas the component value of a specific color component (the magenta M for example) decreases. Therefore, it is possible to suppress excessive use of the ink.

Figure 4D:
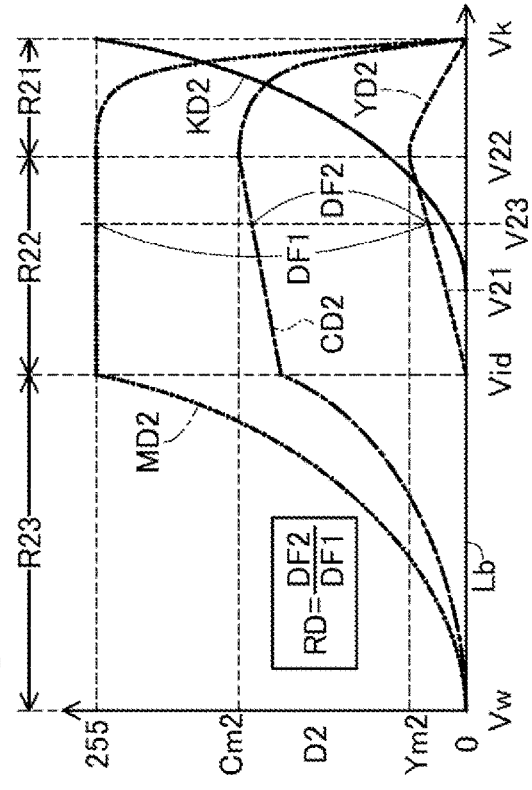
FIG. 4D is a graph depicting an example of corresponding relation on another line.

Note that in part of the color gamut CC, the color conversion look-up table 234 may be configured to change the component value D2 larger than zero without keeping the same constant when the input color value RGB moves toward the black vertex Vk. FIG. 4D is a graph depicting an example of corresponding relation on another line. This shows the corresponding relation on a line Ld passing through a color value Vx. The line Ld is comprised of a partial line connecting the white vertex Vw and the color value Vx at the shortest distance, and a partial line connecting the color value Vx and the black vertex Vk at the shortest distance. The color value Vx is, for example, a color value inside the outer envelope of the color gamut CC. The color phase of the color value Vx is, for example, green.

In the range from the white vertex Vw to the color value Vx, the closer to the black vertex Vk the input color value RGB is, the larger the component values CD2, MD2 and YD2 of the cyan C, the magenta M and the yellow Y become. When the input color value RGB moves from the white vertex Vw to the color value Vx, then the component values CD2, MD2 and YD2 increase from zero up to the maximum values, respectively. The component value KD2 of the black K is zero. In the above manner, when the input color value RGB moves from the white vertex Vw to the color value Vx, then the color expressed by the output color value CMYK changes from the white to the color corresponding to the color value Vx.

In the range from the color value Vx to the black vertex Vk, the closer to the black vertex Vk the input color value RGB is, the smaller the component values CD2, MD2 and YD2 of the cyan C, the magenta M and the yellow Y become. When the input color value RGB moves from the color value Vx to the black vertex Vk, then the component values CD2, MD2 and YD2 decrease from the maximum values down to zero, respectively. Further, the component value KD2 of the black K increases from zero up to 255. In the above manner, when the input color value RGB moves from the color value Vx to the black vertex Vk, then the color expressed by the output color value CMYK changes from the color corresponding to the color value Vx to the black. Note that between a color value Vx close to the white vertex Vw and a color value Vx close to the black vertex Vk, the component values CD2, MD2, YD2, and KD2 are continuous.

Note that on the line Ld, the corresponding relation may be configured for the difference ratio RD explained with FIG. 4B to be constant, regardless of the input color value RGB, thereby suppressing the change of the color phase expressed by the output color value CMYK. However, on at least part of the line Ld, the difference ratio RD may vary according to the change of the output color value RGB.

As depicted by the corresponding relation in FIGS. 4A to 4C, the corresponding relation (to be referred to as first type corresponding relation), which keeps the component value D2 being larger than zero of the specific color component when the input color value RGB approaches the black vertex Vk, may be applied to various parts of the color gamut CC. For example, the first type corresponding relation may be applied to an achromatic color line connecting the white vertex Vw and the black vertex Vk of the color solid CC (FIG. 3). Further, as depicted by the corresponding relation in FIG. 4D, the corresponding relation (to be referred to as second type corresponding relation), which changes the component value D2 being larger than zero without keeping the same constant when the input color value RGB approaches the black vertex Vk, may be applied to various parts of the color gamut CC. For example, the second type corresponding relation may be applied to a line on the outer envelope of the color solid CC (for example, a line connecting the white vertex Vw, the green vertex Vg, and the black vertex Vk).

In any case, the corresponding relation between the input color value RGB and the output color value CMYK is determined experimentally in advance such that colors adapted for the input color value RGB may be printed. For example, the ratio between the component values CD2, MD2, and YD2 of CMY is determined such that colors having the color phase expressed by the input color value RGB may be printed. When the input color value RGB expresses achromatic colors, then the component values CD2, MD2, and YD2 of CMY may be the same. Each of the magnitudes of the component values CD2, MD2, YD2, and KD2 of CMYK may be determined such that colors adapted for the input color value RGB may be printed. For example, in the first corresponding relation depicted in FIG. 4B, the component value MD2 of the magenta M in the indigo intermediate range R22 (that is, the maximum value of the component value MD2) may be smaller than 255. Further, the corresponding relation between some of a plurality of grids in the plurality of grids GD of the color conversion look-up table 234 (FIG. 3) may be determined experimentally whereas the corresponding relation between the other plurality of grids may be determined by the interpolation.

Figure 5:
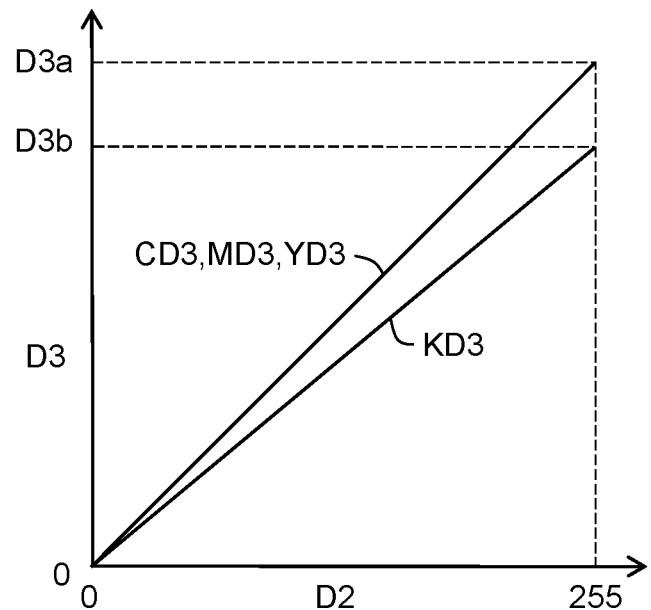
FIG. 5 is a graph depicting an example of relation between a component value D2 and an ink surface density D3.

Note that the feature of ink (the mass per unit volume, the coefficient of viscosity, and the like) may differ according to each type of ink. Therefore, even when the component values D2 are the same between two types of ink, the ink quantity per unit area due to printing (to be also referred to as ink surface density) may differ. Here in this case, the ink quantity shows the ink volume. FIG. 5 is a graph depicting an example of relation between a component value D2 and an ink surface density D3. The horizontal axis shows the component value D2 while the vertical axis shows the ink surface density D3. The graphs CD3, MD3, YD3 and KD3 show the ink surface densities D3 of C, M, Y, and K, respectively. Hereinbelow, the ink surface densities D3 of C, M, Y, and K will be also referred to as ink surface densities CD3, MD3, YD3 and KD3, using the same alpha-numerals as in the graphs.

As illustrated, regardless of the types of ink, the larger the component value D2 is, the larger the ink surface density D3. Further, in the example of FIG. 5, with respect to the inks of CMY, the corresponding relation between the component value D2 and the ink surface density D3 is the same. When the component value D2 changes from zero up to 255, then the ink surface density D3 increases from zero up to a first maximum value D3$a$. With respect to the ink of K, when the component value D2 changes from zero up to 255, then the ink surface density D3 increases from zero up to a second maximum value D3$b$. Here in this case, the second maximum value D3$b$ is smaller than the first maximum value D3$a$. When the component values D2 are the same, then the ink surface density KD3 of the black K is smaller than the ink surface densities CD3, MD3 and YD3 of CMY.

Note that when the printer unit 290 of an ink jet type is used, then the ink surface density D3 can be specified by the following method. First, the volume of one ink droplet jetted from a nozzle is specified. The volume of an ink droplet can be specified by various methods. For example, a high speed camera can be used to photograph ink droplets from a plurality of directions. The plurality of photos show the ink droplets in two-dimensional shapes as viewed from the different directions from each other. From those two-dimensional shapes, a three-dimensional shape of the ink droplets, that is, the volumes, can be estimated. The more the total numbers of the photos, the higher the precision of the volume estimation. When P types (P is an integer larger than one) of the ink droplets in different sizes are used for printing, then each of the ink droplets in P types is estimated. Note that it is possible to specify the types of the ink droplets jetted from the nozzles by using the waveform of a drive signal which drives the actuators (not depicted) of the head 292.

The volume of an ink droplet may be specified by the following method, too. First, the mass of the ink cartridges is measured (to be referred to as first mass). Then, the cartridges whose mass is measured are installed into the installation units. For example, after the mass is measured, the cartridges 400C, 400M, 400Y, and 400K are installed into the installation units 297C, 297M, 297Y, and 297K. The head 292 is caused to jet one type of ink droplets a plurality of times (in this step, the total number of ink droplets is counted). Due to the jets of ink droplets, the ink quantity in the cartridges decreases. Then, the cartridges are removed from the installation units, and the mass of the cartridges is measured (to be referred to as second mass). The difference obtained by subjecting the second mass from the first mass indicates the total mass of the inks jetted from the head 292. On the other hand, the mass per unit volume of the inks is measured (to be referred to as volume density). By dividing the total mass of the inks by the volume density, the total volume of the inks jetted from the head 292 is calculated. By dividing the total volume of the inks by the total number of the ink droplets, the volume of one ink droplet is calculated (the unit is, for example, picoliter). According to this method, it is possible to calculate a kind of average volume even when the volume varies among the plurality of ink droplets jetted from the head 292.

Next, the printer unit 290 is caused to print a patch image. The patch image is an area of a uniform color expressed by one color value. Here in this case, the waveform of the drive signal driving the actuators (not depicted) of the head 292 is used to count the total number of each of the P types of ink droplets. Then, the total ink quantity is calculated from the respective volumes and total numbers of the P types of ink droplets. By dividing the total ink quantity by the area of the patch image, the ink surface density D3 is calculated. The area of the patch image may range from 1 cm$^2$ to 10 cm$^2$. Further, the ink surface density D3 may be the ink quantity per square centimeter.

Note that in order to specify the ink surface density D3 for each ink, the patch image may be printed by using image data of the second color space (the CMYK color space in this embodiment) expressing the patch image, without carrying out the color conversion process. When only the component value CD2 of the cyan C is larger than zero among the color values of CMYK of the patch image, then it is possible to easily specify the ink surface density D3 of the cyan C by printing the patch image. Much the same is true on the other color components.

Figures 6A, 6B:
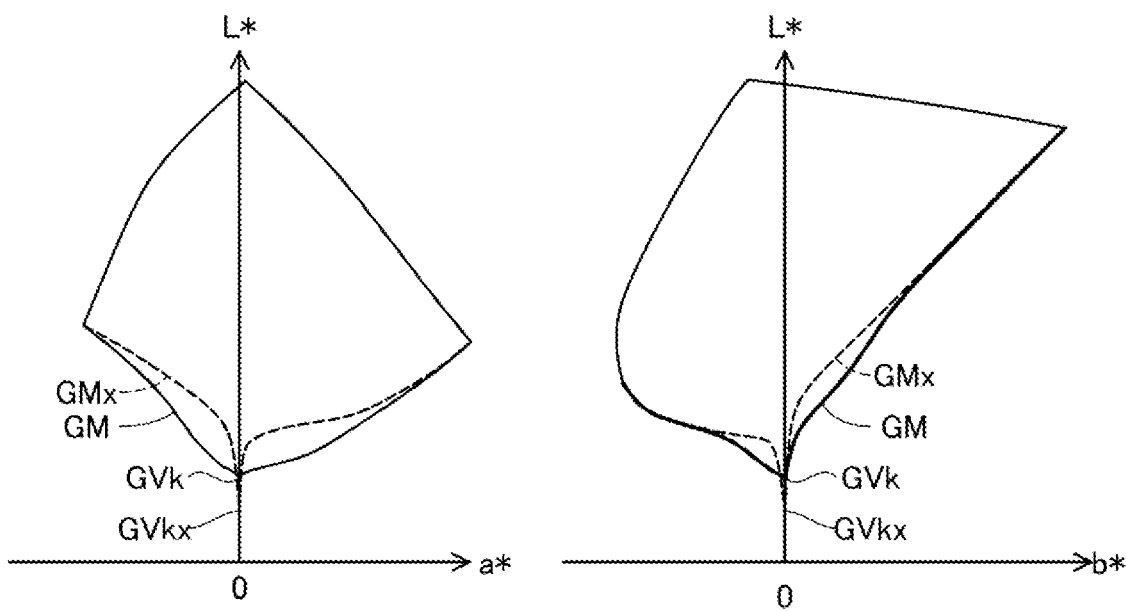
FIGS. 6A and 6B are explanatory diagrams of examples of printable color range.

FIGS. 6A and 6B are explanatory diagrams of examples of printable color range (also referred to as gamut). FIGS. 6A and 6B show the gamut in a CIELAB color space. In FIG. 6A, the horizontal axis shows a* while the vertical axis shows L*. In FIG. 6B, the horizontal axis shows b* while the vertical axis shows L*.

In the figures, two kinds of gamut GM and GMx are depicted. The first gamut GM is for expression this embodiment. The second gamut GMx is for expression of a referential example (to be also referred to as referential gamut GMx). Color values GVk and GVkx in the figures (to be also referred to as black color values GVk and GVkx) express the colors to be printed on the basis of the black vertex Vk (FIG. 3).

The referential gamut GMx shows a range of the colors to be printed by using a referential look-up table (not depicted). The referential look-up table is configured for the ink surface density KD3 of the black K corresponding to the black vertex Vk to be larger than the ink surface density KD3 of the embodiment, so as to lower the luminosity (L*) of the black color value GVkx. For example, when the component value KD2 of the black K is the maximum value (255), then the ink surface density D3 of the black K is larger than the first maximum value D3a. As a result, the luminosity (L*) of the black color value GVkx of the referential gamut GMx is darker than the luminosity (L*) of the black color value GVk of the gamut GM of the embodiment.

Note that when the usage of ink is excessively large, then it is possible to give rise to problems such as a long time of ink drying and the like. Therefore, the referential look-up table is configured for the ink surface densities CD3, MD3 and YD3 of CMY corresponding to the dark colors in the vicinity of the black vertex Vk to be smaller than the ink surface densities CD3, MD3 and YD3 corresponding to the component values CD2, MD2 and YD2, in the same manner as in the embodiment (note that the ink surface densities are compared according to each color component). As a result, the saturation range of the dark colors in the vicinity of the black color value GVkx of the referential gamut GMx is narrower than the saturation range the dark colors in the vicinity of the black color value GVk of the gamut GM of the embodiment. In other words, the color conversion look-up table 234 of this embodiment can expand the color gamut of dark color as compared with the referential look-up table.

In the above manner with this embodiment, the processor 210 of the controller 299 of the multifunctional peripheral 200 (FIG. 1) carries out the following processes. That is, in the step S20 (FIG. 2), the processor 210 acquires the object image data expressed by the color values of the first color space (the RGB color space in this case). In the step S30, the processor 210 carries out the color conversion process by using the color conversion look-up table 234 to generate from the object image data the conversed image data expressed by the color values of the second color space (the CMYK color space in this case). The color conversion look-up table 234 is an example of color conversion information depicting the corresponding relation between the input color values which are the color values of the first color space, and the output color values which are the color values of the second color space. In the steps S40 and S50, the processor 210 uses the conversed image data to generate a print data. In the step S60, the processor 210 supplies the print data to the printer unit 290. The printer unit 290 is an example of printer provided to print images by using L types (L is an integer larger than one) of color materials including a first color material and a second color material being different in color from the first color material. In this embodiment, the color materials in the L types are the inks in the four types of CMYK. Then, the ink of the black K is an example of first color material, and the ink of the magenta M is an example of second color material. Further, the input color values of the RGB color space are expressed by the respective values of the three input color components RGB. Further, the output color values of the CMYK color space are expressed by the respective values of the four output color components CMYK corresponding to the four types of color materials.

Further, FIG. 3 shows the color values and the lines on the outer envelope of the color gamut CC of the RGB color space. For example, the white vertex Vw is an example of white input color value expressing the lightest white. The black vertex Vk is an example of black input color value expressing the darkest black. Further, the three lines La to Lb are an example of specific lines to be explained below (to be also referred to as specific lines La to Lc). The specific lines are comprised of a white side partial line connecting the white vertex Vw and the specific input color value on the outer envelope at the shortest distance, and a black side partial line connecting the specific input color value and the black vertex Vk at the shortest distance. The blue vertex Vb on the first line La corresponds to the specific input color value of the first line La. The first line La is comprised of a first white side partial line La1 and a first black side partial line La2. In the same manner, the indigo point Vid on the second line Lb corresponds to the specific input color value of the second line Lb. The second line Lb is comprised of a second white side partial line Lb1 and a second black side partial line Lb2. The magenta vertex Vm on the third line Lc corresponds to the specific input color value of the third line Lc. The third line Lc is comprised of a third white side partial line Lc1 and a third black side partial line Lc2.

Further, the color conversion look-up table 234 is configured to set up the following corresponding relation. As explained with FIGS. 4A to 4C, within the range from the predetermined first reference color values V11, V21, and V31 on the specific lines La to Lc, the closer to the black vertex Vk the input color value RGB is, the larger the component value KD2 of the black K becomes. Within the dark ranges R11, R21, and R31 which include the black vertex Vk on the specific lines La to Lc and which are closer to the black vertex Vk than the first reference color values V11, V21, and V31, the closer to the black vertex Vk the input color value RGB is, the smaller the component value MD2 of the magenta M becomes. Here in this case, the second reference color values V12, V22, and V32 are the color values close to the white vertex Vw of the dark ranges R11, R21, and R31. The second reference color values V12, V22, and V32 are closer to the black vertex Vk than the first reference color values V11, V21, and V31 (that is, the dark ranges R11, R21, and R31 are closer to the black vertex Vk than the first reference color values V11, V21, and V31). Within the light ranges R13, R23, and R33 which include the white vertex Vw on the specific lines La to Lc, the closer to the black vertex Vk the input color value RGB is, the larger the component value MD2 of the magenta M becomes. Within the intermediate ranges R12, R22, and R32 between the light ranges R13, R23, and R33 and the dark ranges R11, R21, and R31 on the specific lines La to Lc, the component value MD2 of the magenta M is constant. In other words, in the color conversion process, the processor 210 converts the input color value RGB into the component value KD2 of the black K and the component value MD2 of the magenta M, wherein 1) the input color value RGB is a color value on the specific line which connects the white vertex Vw indicating the color value expressing the white on the outer envelope of the color gamut CC of the RGB color space and the specific input color value on the outer envelope and which connects the specific input color value on the outer envelope and the black vertex Vk indicating the color value expressing the black, and the input color value RGB lies in the intermediate ranges R12, R22 and R32 between the light ranges R13, R23 and R33 and the dark ranges R11, R21, and R31; 2) the component value KD2 of the black K is such a value of the output color component corresponding to the black K that the closer to the black vertex Vk the input color value RGB is, the larger the component value KD2 of the black K becomes; and 3) the component value MD2 of the magenta M is such a value of the output color component corresponding to the magenta M that the closer to the black vertex Vk the input color value RGB is, the smaller the increase than the component value KD2 of the black K (including zero in the increase).

In this manner, in such a part of the intermediate range R12, R22 and R32 on the specific lines La to Lc as closer to the black vertex Vk than the first reference color values V11, V21, and V31, the closer to the black vertex Vk the input color value RGB is, the larger the component value KD2 of the black K becomes, while the component value MD2 of the magenta M is constant. Therefore, as compared with the case where the closer to the black vertex Vk the input color value RGB is, the smaller the component value MD2 of the magenta M becomes, it is possible to expand the color gamut of dark colors to be printed. For example, it is possible to print colors being dark and having a high saturation.

Further, within the dark ranges R11, R21, and R31 including the black vertex Vk on the specific lines La to Lc, the closer to the black vertex Vk the input color value RGB is, the smaller the component value MD2 of the magenta M becomes. Therefore, when images are printed on the basis of the input color value RGB within the dark ranges R11, R21, and R31, it is possible to suppress excessive use of the ink. For example, the printable pages may increase in number.

Further, in this embodiment, the first color material is for the black K, whereas the second color material is for the magenta M. Therefore, when the printer unit 290 uses the color material of the black K and the color material of the magenta M to print images, it is possible to expand the color gamut of dark colors to be printed.

Further, in this embodiment, the number of types L of the color materials used for printing is larger than two (in particular, L=4). Then, the color materials in the L types include a third color material which is different in color from both the first color material (the black ink in this case) and the second color material (the magenta ink in this case). The ink of the cyan C is an example of the third color material. Then, the color conversion look-up table 234 is configured to set up the following corresponding relation. As explained with FIG. 4B, within the dark range R21 including the black vertex Vk on the specific line Lb, the closer to the black vertex Vk the input color value RGB is, the smaller the component value CD2 of the cyan C becomes. Here in this case, the second reference color value V22, which is the color value close to the white vertex Vw of the dark range R21, is closer to the black vertex Vk than the first reference color value V21 (that is, the dark range R21 is closer to the black vertex Vk than the first reference color value V21).

Within the light range R23 including the white vertex Vw on the specific line Lb, the closer to the black vertex Vk the input color value RGB is, the larger the component value CD2 of the cyan C becomes. Within the intermediate range R22 between the light range R23 and the dark range R21 on the specific line Lb, the closer to the black vertex Vk the input color value RGB is, the larger the component value CD2 of the cyan C becomes. In other words, in the color conversion process, the processor 210 converts the input color value RGB into the component value KD2 of the black K and the component value CD2 of the cyan C, wherein 1) the input color value RGB is a color value on the specific line which connects the white vertex Vw indicating the color value expressing the white on the outer envelope of the color gamut CC of the RGB color space and the specific input color value on the outer envelope and which connects the specific input color value on the outer envelope and the black vertex Vk indicating the color value expressing the black, and the input color value RGB lies in the intermediate ranges R12, R22 and R32 between the light ranges R13, R23 and R33 and the dark ranges R11, R21, and R31; 2) the component value KD2 of the black K is such a value of the output color component corresponding to the black K that the closer to the black vertex Vk the input color value RGB is, the larger the component value KD2 of the black K becomes; and 3) the component value CD2 of the cyan C is such a value of the output color component corresponding to the component value CD2 of the cyan C that the closer to the black vertex Vk the input color value RGB is, the smaller the increase than the component value KD2 of the black K (including zero in the increase).

According to this configuration, in such a part of the intermediate range R22 on the specific line Lb as closer to the black vertex Vk than the first reference color value V21, the closer to the black vertex Vk the input color value RGB is, the larger the component value KD2 of the black K becomes, and the larger the component value CD2 of the cyan C becomes. Therefore, as compared with the case where the closer to the black vertex Vk the input color value RGB is, the smaller the component value CD2 of the cyan C becomes, it is possible to expand the color gamut of dark colors to be printed. For example, it is possible to print colors being dark and having the high saturation.

Further, the color materials in the L types include a fourth color material which is different in color from any of the first color material (the ink of the black K in this case), the second color material (the ink of the magenta M in this case), and the third color material (the ink of the cyan C in this case). The ink of the yellow Y is an example of the fourth color material. Then, the color conversion look-up table 234 is configured to set up the following corresponding relation. As explained with FIG. 4B, the first difference DF1 is obtained by subtracting the minimum value from the maximum value, among the component values MD2, CD2 and YD2 of MCY. The second difference DF2 is obtained by subtracting the minimum value from the medium value, among the component values MD2, CD2 and YD2 of MCY. Within the intermediate range R22 on the specific line Lb, the difference ratio RD (=DF2/DF1) is constant. According to this configuration, when the input color value RGB changes on the specific line Lb, the color phase expressed by the output color value CMYK is restrained from change. Note that the difference ratio RD may differ among the three ranges R21, R22, and R23 on the specific line Lb. For example, in at least one of the indigo dark range R21 and the indigo light range R23, the difference ratio RD may vary according to the change of the input color value RGB. Note that in the indigo intermediate range R22, the difference ratio RD may vary according to the change of the input color value RGB.

Further, in this embodiment, the third color material is for the cyan C. Therefore, when the printer unit 290 uses the color material of the black K, the color material of the magenta M, and the color material of the cyan C to print images, it is possible to expand the color gamut of dark colors to be printed.

Further, in this embodiment, the number of types L of the color materials used for printing is larger than two (in particular, L=4). Then, the color materials in the L types include a fourth color material which is different in color from any of the first color material (the black ink in this case), the second color material (the magenta ink in this case), and the third color material (the cyan ink in this case). The ink of the yellow Y is an example of the fourth color material. Then, the color conversion look-up table 234 is configured to set up the following corresponding relation. As explained with FIGS. 4A to 4C, within the intermediate ranges R12, R22 and R32 on the specific lines La to Lc, the closer to the black vertex Vk the input color value RGB is, the larger the component value YD2 of the yellow Y becomes. Therefore, the output color value CMYK may vary according to the change of the input color value RGB.

Further, as explained with FIGS. 4A to 4D and FIG. 5, the value of each of the four colors components of the output color value CMYK shows the quantity of the corresponding color material per unit area. Therefore, the processor 210 can generate suitable print data to supply the printer unit 290 by using the converted image data.

Note that when the input color value RGB changes but the quantity of a color material per unit area (that is, the ink surface density D3) is constant, then it can be said that the component value D2 corresponding to that color material is constant. Here in this case, the ink surface density D3 may change within the range of measurement error of the ink surface density D3. The measurement error of the ink surface density D3 may be specified from the measurement error of the volume of ink droplets, and the measurement error of the total number of ink droplets.

Further, as explained with FIG. 5, the quantity of the ink of the black K per unit area (the second maximum value D3b) expressed by the maximum value of the component value KD2 of the black K (=255 here in this case) is smaller than the quantity of the ink of the magenta M per unit area (the first maximum value D3a) expressed by the maximum value of the component value MD2 of the magenta M (=255 here in this case). Therefore, compared to the case where the quantity of the ink of the black K per unit area expressed by the maximum value of the component value KD2 of the black K is larger than the quantity of the ink of the magenta M per unit area expressed by the maximum value of the component value MD2 of the magenta M, it is possible to reduce the quantity of using the ink of the black K. Generally, when a text is printed, then the color of the text is usually black. When there is a small quantity of the ink of the black K per unit area, then the printable pages increase for an image including texts.

Further, images are often printed on paper of light color such as white or the like. Hence, even when the quantity of the ink of the black K is small per unit area, there is still a high contrast of a text printed in black. The human eye does not use absolute lightness but uses contrast to recognize the lightness of an observed object. Therefore, even when the quantity of the ink of the black K is small per unit area, it is still possible for the human eye to recognize that the color of a text printed in black is sufficiently dark.

Further, generally, when the quantity of the ink of the black K is small per unit area, then the color gamut of a dark color is more likely to be narrow. In this embodiment, as explained with FIGS. 4A to 4C, in the intermediate range R12, R22 and R32, the component value MD2 of the magenta M is constant (that is, the quantity of using the ink of the magenta M is constant). By virtue of this, the color gamut of dark color is expanded. By virtue of the above fact, it is possible to realize both the expansion of the color gamut of dark color, and the reduction of quantity of using the ink of the black K.

Modified Embodiments (1) In the embodiment as depicted in FIGS. 4A and 4B, the second dark range where the closer to the black vertex Vk the input color value RGB is, the smaller the component value CD2 of the cyan C becomes may be different from the first dark ranges R11 and R21 where the closer to the black vertex Vk the input color value RGB is, the smaller the component value MD2 of the magenta M becomes. Further, the second light range where the closer to the black vertex Vk the input color value RGB is, the larger the component value CD2 of the cyan C becomes may be different from the first light ranges R13 and R23 where the closer to the black vertex Vk the input color value RGB is, the larger the component value MD2 of the magenta M becomes.

(2) In the embodiment as depicted in FIGS. 4A to 4C, among the intermediate ranges R12, R22 and R32, the range where the closer to the black vertex Vk the input color value RGB is, the larger the component value YD2 of the yellow Y becomes may be a part of the intermediate ranges R12, R22 and R32. For example, the range of a larger component value YD2 of the yellow Y may be such that the component value KD2 of the black K is zero.

(3) The first reference color value V11 as depicted in FIG. 4A may be positioned in the blue light range R13. In the same manner, the first reference color value V21 as depicted in FIG. 4B may be positioned in the indigo light range R23, and the first reference value V31 as depicted in FIG. 4C may be positioned in the magenta light range R33.

(4) In the embodiment as depicted in FIG. 5, the quantity of the ink of the black K (the second maximum value D3b) per unit area expressed by the maximum value of the component value KD2 of the black K (=255 here in this case) may be larger than or equal to the quantity of the ink of the magenta M (the first maximum value D3a) per unit area expressed by the maximum value of the component value MD2 of the magenta M (=255 here in this case).

(5) The specific input color value positioned midway on the specific line may be any of various color values on the outer envelope of the color gamut in the first color space. In any case, the specific line is on the outer envelope of the color gamut in the first color space, and is comprised of a white side partial line connecting the white input color value and the specific input color value at the shortest distance, and a black side partial line connecting the black input color value and the specific input color value at the shortest distance. Here in this case, the value of each of at least one but at most N−1 of the N color components of the specific input color value (RGB, for example) may be the maximum value of the attainable range (=255, for example).

(6) In the above embodiment, the inks of K, M, C, and Y are examples of the first to fourth color materials, respectively. The corresponding relation between the first to fourth color materials and the ink types may be other than the above. For example, the second color material may be the ink of the cyan C or the yellow Y. The third color material may be the ink of the magenta M or the yellow Y. The fourth color material may be the ink of the magenta M or the cyan C.

(7) The first color space may be any of various color spaces expressed by N color components (N is an integer larger than one) such as a YCbCr color space, an RC (red cyan) color space or the like, instead of the RGB color space.

(8) The color materials usable for printing may be toners instead of inks. That is, the printer may be a laser printer apparatus. Further, the color materials usable for printing may be various color materials in L types (L is an integer larger than one) such as RCK (red cyan black), YK (yellow black) or the like instead of the color materials in the four types of CMYK. The second color space may be any of various color spaces expressed by L color components corresponding to the L types of color materials.

(9) The color conversion information may be in various types expressing the corresponding relation between the input color value of the first color space and the output color value of the second color space, instead of the color conversion look-up table 234 explained with FIG. 3. For example, the color conversion information may be a function for calculating the output color value by using the input color value as an argument.

(10) Instead of the process of FIG. 2, the image processing steps carried out by the image processing apparatus may be any of various processes configured to include a process for acquiring an object image data, a process for generating a converted image data from the object image data by carrying out a color conversion process, a process for generating a print data by using the converted image data, and a process for supplying the print data to a printer. For example, the image may be divided into a plurality of partial images. Then, the plurality of partial images may be printed by repeating the process of the steps S10 to S70 on one partial image after another.

(11) The image processing steps (the process of FIG. 2, for example) may be carried out by any of various systems. For example, from the multifunctional peripheral 200 (FIG. 1), the scanner 280 may be omitted. Generally, a printer including an image processing apparatus (the controller 299, for example), and a printer (the printer unit 290, for example) may carry out the process of FIG. 2. In this context, the printer may be an apparatus with the single function for printing. Further, like the multifunctional peripheral 200 including the scanner 280, the printer may be a system including an apparatus(es) for a process(es) different from printing. The printing medium used by the printer is not limited to printing paper, but may be any of various media such as cloths, resin products, metallic products, and the like. Further, the image processing steps may be carried out by an external device (such as a personal computer, for example) connected to the printer, instead of the controller of the multifunctional peripheral 200 (or the printer, in particular). The external device may supply the generated print data to the printer. Further, a plurality of apparatuses (for example, computers) allowed for mutual communications via a network may each partially share the function for image processing provided by the image processing apparatus, and provide the function for image processing as a whole (a system including these apparatuses corresponds to the image processing apparatus).

In the above embodiment and each modified embodiment, part of the configuration realized by hardware may be replaced by software or, conversely, part or all of the configuration realized by software may be replaced by hardware. For example, the function of the step S30 of FIG. 2 may be realized by a dedicated hardware circuit.

Further, when part or all of the function of the present disclosure is realized by a computer program, then the computer program can be provided in such a form as stored in a computer readable recording medium (a non-temporary recording medium, for example). The program may be used in a state stored in a recording medium (a computer readable recording medium) identical to or different from that when first provided. The term "a computer readable recording medium" is not limited to portable recording media such as memory cards or CD-ROMs, but may include internal memories used inside a computer such as various types of ROM, external memories connected to computers such as hard disk drives, or the like.

Hereinabove, the present disclosure was explained on the basis of the embodiment and modified embodiments. However, those abovementioned embodiments of the disclosure are to facilitate understanding the present disclosure but not to limit the present disclosure. The present disclosure may undergo any modification and improvement without departing from the true spirit and scope thereof and, at the same time, any equivalence thereto is included in the present disclosure.

What is claimed is:

1. An image processing apparatus comprising:
a controller configured to:
obtain a target image data expressed by color values of a first color space;
convert the target image data into a converted image data expressed by color values of a second color space, by a color conversion process using color conversion information expressing a corresponding relation between an input color value which is a color value of the first color space and an output color value which is a color value of the second color space; and
generate a print data using the converted image data; and
a supplier configured to supply the print data to a printer unit configured to print an image by using L types of color materials (L≥2) including a first color material and a second color material different in color from the first color material,
wherein the input color value of the first color space is expressed by each value of N input color components (N≥2), and the output color value of the second color space is expressed by each value of L output color components corresponding to the L types of color materials,
wherein on an outer envelope of a color gamut of the first color space,
white input color value is defined as the color value expressing the lightest white,
black input color value is defined as the color value expressing the darkest black, and
a specific line is defined as a line including a white-side partial line connecting the white input color value and a specific input color value on the outer envelope at the shortest distance, and a black-side partial line connecting the specific input color value and the black input color value at the shortest distance,
wherein a noticed output color value is the output color value associated with a noticed input color value on the specific line by the color conversion information, wherein a first output component value is a value of the output color component of the noticed output color value corresponding to the first color material, wherein a second output component value is a value of the output color component of the noticed output color value corresponding to the second color material, wherein the color conversion information is configured such that:

within the range from a predetermined first reference color value to the black input color value on the specific line, the closer to the black input color value the noticed input color value is, the larger the first output component value becomes;

within a first dark range on the specific line which includes the black input color value and which is closer to the black input color value than the predetermined first reference color value, the closer to the black input color value the noticed input color value is, the smaller the second output component value becomes;

within a first light range on the specific line which includes the white input color value, the closer to the black input color value the noticed input color value is, the larger the second output component value becomes; and within a first intermediate range on the specific line between the first light range and the first dark range, the second output component value is constant, wherein the target image data includes the input color value with which the second output component value is constant within the first intermediate range when the first output component value increases, and the converted image data includes the output color value with which the second output component value is constant within the first intermediate range when the first output component value increases, and wherein the controller is configured to generate the print data by using the converted image data which includes the output color value with which the second output component value is constant within the first intermediate range when the first output component value increases.

2. The image processing apparatus according to claim 1, wherein the first color material is a black color material, and the second color material is one of a cyan color material, a magenta color material, and a yellow color material.

3. The image processing apparatus according to claim 1, wherein the L types of color materials include a third color material different in color from both the first color material and the second color material, wherein a third output component value is a value of the output color component of the noticed output color value corresponding to the third color material, and wherein the color conversion information is configured such that:

within a second dark range on the specific line which includes the black input color value and which is closer to the black input color value than the predetermined first reference color value, the closer to the black input color value the noticed input color value is, the smaller the third output component value becomes;

within a second light range on the specific line which includes the white input color value, the closer to the black input color value the noticed input color value is, the larger the third output component value becomes; and within a second intermediate range on the specific line between the second light range and the second dark range, the larger the third output component value.

4. The image processing apparatus according to claim 3, wherein the number L is larger than three, wherein the L types of color materials include a fourth color material different in color from all of the first color material, the second color material, and the third color material, wherein a fourth output component value is a value of the output color component of the noticed output color value corresponding to the fourth color material, wherein a first difference DF1 is a difference obtained by subtracting the minimum value from the maximum value among the second output component value, the third output component value, and the fourth output component value, wherein a second difference DF2 is a difference obtained by subtracting the minimum value from the medium value among the second output component value, the third output component value, and the fourth output component value, and wherein the color conversion information is configured such that the ratio DF2/DF1 is constant within the first intermediate range on the specific line.

5. The image processing apparatus according to claim 3, wherein the first color material is a black color material, wherein the second color material is one of a cyan color material, a magenta color material, and a yellow color material, and wherein the third color material is one the cyan color material, the magenta color material, and the yellow color material, and is a different color material from the second color material.

6. The image processing apparatus according to claim 1, wherein the number L is larger than two, wherein the L types of color materials include a fourth color material different in color from both the first color material and the second color material, wherein a fourth output component value is a value of the output color component of the noticed output color value corresponding to the fourth color material, and wherein the color conversion information is configured such that within at least part of the first intermediate range on the specific line, the closer to the black input color value the noticed input color value is, the larger the fourth output component value becomes.

7. The image processing apparatus according to claim 1, wherein each value of the L color components of the output color value expresses the quantity per unit area of the corresponding color material.

8. The image processing apparatus according to claim 7, wherein the quantity per unit area of the first color material expressed by the maximum value of the color component of the output color value corresponding to the first color material is smaller than the quantity per unit area of the second color material expressed by the maximum value of the color component of the output color value corresponding to the second color material.

9. A printer comprising:
the image processing apparatus as defined in claim 1; and the printer unit.

10. An image processing apparatus comprising:
a controller configured to:
obtain a target image data expressed by color values of a first color space;

convert the target image data into a converted image data expressed by color values of a second color space, by a color conversion process using color conversion information expressing a corresponding relation between an input color value which is a color value of the first color space and an output color value which is a color value of the second color space; and generate a print data using the converted image data; and a supplier configured to supply the print data to a printer unit configured to print an image by using L types of color materials (L≥2) including a first color material and a second color material different in color from the first color material, wherein the input color value of the first color space is expressed by each value of N input color components (N≥2), and the output color value of the second color space is expressed by each value of L output color components corresponding to the L types of color materials, wherein on an outer envelope of a color gamut of the first color space, white input color value is defined as the color value expressing the lightest white, black input color value is defined as the color value expressing the darkest black, and a specific line is defined as a line including a white-side partial line connecting the white input color value and a specific input color value on the outer envelope at the shortest distance, and a black-side partial line connecting the specific input color value and the black input color value at the shortest distance, wherein a noticed output color value is the output color value associated with a noticed input color value on the specific line by the color conversion information, wherein a first output component value is a value of the output color component of the noticed output color value corresponding to the first color material, wherein a second output component value is a value of the output color component of the noticed output color value corresponding to the second color material, wherein the color conversion information is configured such that:

within the range from a predetermined first reference color value to the black input color value on the specific line, the closer to the black input color value the noticed input color value is, the larger the first output component value becomes;

within a first dark range on the specific line which includes the black input color value and which is closer to the black input color value than the predetermined first reference color value, the closer to the black input color value the noticed input color value is, the smaller the second output component value becomes;

within a first light range on the specific line which includes the white input color value, the closer to the black input color value the noticed input color value is, the larger the second output component value becomes; and within a first intermediate range on the specific line between the first light range and the first dark range, the second output component value increases, wherein the target image data includes the input color value with which the second output component value increases within the first intermediate range when the first output component value increases, wherein the converted image data includes the output color value with which the second output component value increases within the first intermediate range when the first output component value increases, and wherein the controller is configured to generate the print data by using the converted image data which includes the output color value with which the second output component value increases within the first intermediate range when the first output component value increases.

11. The image processing apparatus according to claim 10, wherein the L types of color materials include a third color material different in color from both the first color material and the second color material, and a fourth color material different in color from all of the first color material, the second color material, and the third color material, wherein a third output component value is a value of the output color component of the noticed output color value corresponding to the third color material, wherein a fourth output component value is a value of the output color component of the noticed output color value corresponding to the fourth color material, wherein a first difference DF1 is a difference obtained by subtracting the minimum value from the maximum value among the second output component value, the third output component value, and the fourth output component value, wherein a second difference DF2 is a difference obtained by subtracting the minimum value from the medium value among the second output component value, the third output component value, and the fourth output component value, and wherein the color conversion information is configured such that the ratio DF2/DF1 is constant within the first intermediate range on the specific line.

12. An image processing apparatus comprising:

a controller configured to:

obtain a target image data expressed by color values of a first color space;

convert the target image data into a converted image data expressed by color values of a second color space, by way of carrying out a color conversion process using color conversion information expressing a corresponding relation between an input color value which is a color value of the first color space and an output color value which is a color value of the second color space; and generate a print data using the converted image data, wherein in the color converting process, the controller is configured to convert a noticed input color value into a first output component value and a second output component value, wherein the noticed input color value is a color value on a specific line connecting a white input color value expressing the white and a black input color value expressing the black on an outer envelope of a color gamut of the first color space, and the noticed input color value lies in a first intermediate range between a first light range and a first dark range, wherein the first output component value is a value of the output color component corresponding to a first color material, and the closer to the black input color value the noticed input color value is, the larger the first output component value becomes, and wherein the second output component value is a value of the output color component corresponding to a second color material, and the closer to the black input color value the noticed input color value is, the less or zero the increase of the second output component value than the first output component value.

13. The image processing apparatus according to claim 12, wherein in the first dark range, the closer to the black input color value the noticed input color value is, the smaller the second output component value becomes.

14. The image processing apparatus according to claim 12, wherein in the color converting process, the controller is configured to convert the noticed input color value in the first intermediate range into a third output component value which is a value of the output color component corresponding to a third color material, and a fourth output component value which is a value of the output color component corresponding to a fourth color material and, wherein in the first intermediate range, a ratio of the difference between the second output component value and the fourth output component value, to the difference between the third output component value and the fourth output component value is constant.

15. The image processing apparatus according to claim 14, wherein the difference between the second output component value and the fourth output component value is larger than the difference between the second output component value and the third output component value, and larger than the difference between the third output component value and the fourth output component value.

16. The image processing apparatus according to claim 15, wherein in the first intermediate range, the second output component value is the maximum value whereas the fourth output component value is the minimum value.

\* \* \* \* \*